J. H. VAN DEVENTER.
METALLIC PACKING.
APPLICATION FILED APR. 22, 1912.

1,070,087.

Patented Aug. 12, 1913.

WITNESSES:

INVENTOR
John Herbert Van Deventer
BY
ATTORNEY

BEST AVAILABLE COPY

UNITED STATES PATENT OFFICE.

JOHN HERBERT VAN DEVENTER, OF BUFFALO, NEW YORK, ASSIGNOR TO BUFFALO FORGE COMPANY, OF BUFFALO, NEW YORK, A CORPORATION OF NEW YORK.

METALLIC PACKING.

1,070,087.

Specification of Letters Patent. Patented Aug. 12, 1913.

Application filed April 22, 1912. Serial No. 692,312.

*To all whom it may concern:*

Be it known that I, JOHN HERBERT VAN DEVENTER, a citizen of the United States of America, residing at Buffalo, county of Erie, and State of New York, have invented certain new and useful Improvements in Metallic Packing, of which the following is a full, clear, and exact description.

My invention relates generally to packing for rotating or oscillating shafts and spindles, which must be packed to prevent the escape of steam, and more particularly to packing for the shafts of rotary engines.

The objects of my invention have been: To provide a metallic packing which shall efficiently prevent leakage of the steam or fluid; one which shall not require excessive pressure between it and the shaft; one producing very little friction; one which shall require little or no attention and be self adjusting; and one which shall have long life and be easily renewable.

Figure 1:
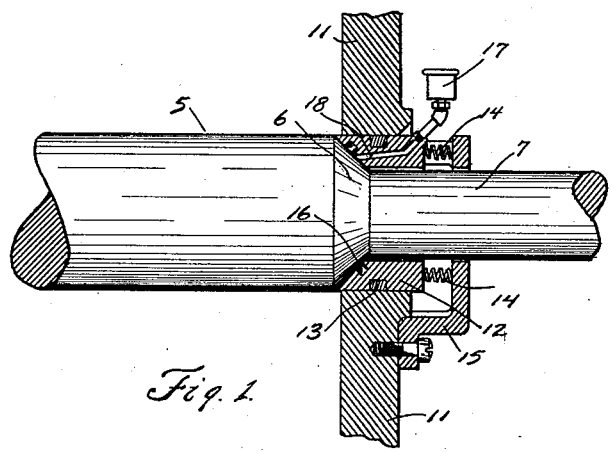
Figure 2:
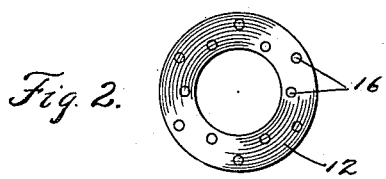
Figure 3:
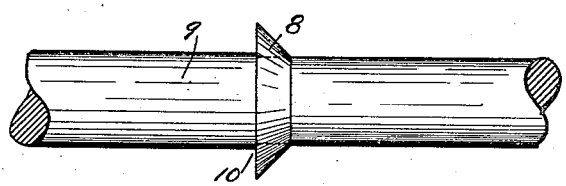

Reference is to be had to the accompanying drawings forming part of the specification, in which like characters of reference indicate like parts throughout the several views of which:

Figure 1 shows a sectional view of my packing as applied to a rotary shaft. Fig. 2 is a front view of the packing ring. Fig. 3 shows a shaft of a modified form with a tapered shoulder or collar secured thereon.

In the drawing (Figs. 1 and 2) 5 represents the shaft of a rotary engine or any other rotating or oscillating shaft or spindle which is provided with a tapered shoulder 6. This shoulder may be formed by having a portion 7 of the shaft reduced in diameter as shown in Fig. 1 or a separate collar 8 may be secured to a shaft 9, as shown in Fig. 3. When the last mentioned form is used the shaft 9 is preferably provided with a small shoulder 10 against which the collar 8 rests. 11 represents a fragmentary part of a cylinder head which supports the shaft and the packing. 12 is the packing ring which is slidably disposed in an aperture provided in the head 11. This ring is preferably of the same diameter but not larger than the larger portion of the shaft 5 or the outer diameter of the collar 8 and is provided on its inner face with a taper corresponding to the taper of the shoulder 6 or collar 8. Packing 13 is placed in preferably an annular groove formed in the ring 12 and serves to prevent leakage between this ring and the head 11.

The packing ring 12 is held against the tapered shoulder or collar by spring tension means of any one of the well known types. For convenience in the drawings, I have shown helical springs 14 which are disposed between the outer face of the ring and a yoke 15 which is secured to the head 11 by suitable means. This style of yoke is shown for illustration only, and of course, will be varied to suit the spring tension means used and also local conditions.

Graphite studs 16 are preferably set in flush with the tapered face of the ring 12 and these wear down with the said tapered face and provide lubrication for the bearing between the said ring and tapered shoulder or collar. Should it be desired to lubricate this bearing with a liquid or semi-liquid lubricant, an oil or grease cup 17 may be provided and connected to the packing ring 12 by suitable connections. A port 18 may be provided, leading from said connections to the surfaces to be lubricated.

As the packing ring is of preferably the same diameter as the tapered shoulder or collar, it will be seen that, when there is a pressure of steam against the cylinder head, the said pressure does not bear against the said packing ring, and therefore, has no tendency to force it away from its contact with the said shoulder or collar. Thus, but little external spring pressure is needed on the said ring to make a tight joint. The spring pressure being light, the packing ring acts as a safety valve for the condensation in the cylinder, which condensation will be discharged between the said ring and tapered shoulder or collar. If there is any end motion of the shaft upon which my packing is used, the spring tension means bearing against the packing ring will allow the said ring to move and follow the shaft, thus keeping a steam-tight joint at all times.

Obviously, some detail modifications may be made from the device herein shown and described besides those hereinbefore mentioned, without departing from the spirit of my invention or the scope of the appended claims and I do not wish to be limited to the exact embodiment herein shown and described.

Having thus described my invention, what I claim is:

1. A metallic packing, comprising a rotating shaft provided with a rigid tapered portion, a slidable packing ring provided with a tapered face, engageable with the tapered portion of said shaft, and spring tension means bearing against said packing ring, said packing ring being of a diameter not greater than the diameter of the tapered portion of said shaft, whereby the pressure of steam cannot bear against said ring and force it from its seat.

2. A metallic packing, comprising a rotating shaft provided with a reduced portion, a tapered portion formed between said shaft and the said reduced portion thereof, a slidable packing ring provided with a tapered face, engageable with the tapered portion of said shaft and spring tension means bearing against said packing ring, said packing ring being of a diameter not greater than the diameter of the tapered portion of said shaft, whereby the pressure of steam cannot bear against said ring and force it from its seat.

3. A metallic packing, comprising a rotating shaft provided with a rigid tapered portion, a slidable packing ring provided with a tapered face, engageable with the tapered portion of said shaft, spring tension means bearing against said packing ring, and lubricating means carried by said packing ring, said packing ring being of a diameter not greater than the diameter of the tapered portion of said shaft, whereby the pressure of steam cannot bear against said ring and force it to its seat.

4. A metallic packing, comprising a rotating shaft provided with a rigid tapered portion, a slidable packing ring provided with a tapered face, engageable with the tapered portion of said shaft, spring tension means bearing against said packing ring, and dry lubricating means secured in said packing ring and flush with the tapered face thereof, said packing ring being of a diameter not greater than the diameter of the tapered portion of said shaft, whereby the pressure of steam cannot bear against said ring and force it from its seat.

5. A metallic packing for rotating shafts, comprising a tapered collar rigidly secured to said shaft, a slidable packing ring provided with a tapered face, engageable with said tapered collar, and spring tension means bearing against said packing ring, said packing ring being of a diameter not greater than the diameter of said tapered collar, whereby the pressure of steam cannot bear against said ring and force it from its seat.

6. In a metallic packing, the combination with a cylinder head; of a rotating shaft provided with a rigid tapered portion, a packing ring slidably carried by said cylinder head and provided with a tapered face engageable with the tapered portion of said shaft and spring tension means bearing against said packing ring, said packing ring being of a diameter not greater than the diameter of the tapered portion of said shaft, whereby the pressure of steam against said cylinder head cannot bear against said ring and force it from its seat.

7. In a metallic packing, the combination with a cylinder head; of a rotating shaft provided with a rigid tapered portion, a packing ring slidably carried by said cylinder head and provided with a tapered face engageable with the tapered portion of said shaft, spring tension means bearing against said packing ring, and lubricating means carried by said packing ring, said packing ring being of a diameter not greater than the diameter of the tapered portion of said shaft, whereby the pressure of steam against said cylinder head cannot bear against said ring and force it from its seat.

8. In a metallic packing, the combination with a cylinder head; of a rotating shaft provided with a rigid tapered portion, a packing ring slidably carried by said cylinder head and provided with a tapered face engageable with the tapered portion of said shaft, spring tension means bearing against said packing ring, and dry lubricating means secured in said packing ring and flush with the tapered face thereof, said packing ring being of a diameter not greater than the diameter of the tapered portion of said shaft, whereby the pressure of steam against said cylinder head cannot bear against said ring and force it from its seat.

9. In a metallic packing, the combination with a cylinder head; of a rotating shaft provided with a rigid tapered portion, a packing ring slidably carried by said cylinder head and provided with a tapered face engageable with the tapered portion of said shaft, spring tension means bearing against said packing ring, and packing means carried by said ring for packing the joint between said ring and said cylinder head, said packing ring being of a diameter not greater than the diameter of the tapered portion of said shaft, whereby the pressure of steam against said cylinder head cannot bear against said ring and force it from its seat.

10. In a metallic packing, the combination with a cylinder head; of a rotating shaft provided with a rigid tapered portion, a packing ring slidably carried by said cylinder head and provided with a tapered face engageable with the tapered portion of said shaft, spring tension means bearing against said packing ring, dry lubricating means secured in said packing ring and flush with the tapered face thereof, and packing means carried by said ring for packing the joint between said ring and said cylinder head, said packing ring being of a diameter not greater than the diameter of the tapered portion of said shaft, whereby the pressure of steam against said cylinder head cannot bear against said ring and force it from its seat.

11. In a rotary engine, the combination with the cylinder head thereof; of a metallic packing comprising a rotating shaft provided with a rigid tapered portion, a packing ring slidably carried by said cylinder head and provided with a tapered face, engageable with the tapered portion of said joint, spring tension means bearing against said packing ring, said packing ring being of a diameter not greater than the diameter of the tapered portion of said shaft, whereby the pressure of steam against said cylinder head cannot bear against said ring and force it from its seat.

12. In a rotary engine, the combination with the cylinder head and rotating shaft thereof; of a metallic packing comprising a tapered collar rigidly secured to said shaft, a slidable packing ring provided with a tapered face, engageable with the said tapered collar, lubricating means carried by said packing ring and spring tension means bearing against said packing ring, said packing ring being of a diameter not greater than the diameter of said tapered collar, whereby the pressure of steam in said engine cannot bear against said packing ring and force it from its seat.

In testimony whereof, I have hereunto signed my name in the presence of two subscribing witnesses.

JOHN HERBERT VAN DEVENTER.

Witnesses:
J. WM. ELLIS,
WALTER H. KELLEY.